United States Patent
Ha

(10) Patent No.: US 8,024,061 B2
(45) Date of Patent: Sep. 20, 2011

(54) METHOD AND DEVICE TO GENERATE POSITION PROFILE IN MOTION CONTROLLER

(75) Inventor: Jung Ik Ha, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1343 days.

(21) Appl. No.: 11/132,347

(22) Filed: May 19, 2005

(65) Prior Publication Data
US 2006/0089748 A1    Apr. 27, 2006

(30) Foreign Application Priority Data
Oct. 22, 2004    (KR) .................. 10-2004-0085041

(51) Int. Cl.
*G06F 19/00*    (2006.01)
(52) U.S. Cl. .............. 700/186; 700/28; 700/64; 700/69; 318/574
(58) Field of Classification Search .................. 700/186, 700/64, 69, 28; 318/574
See application file for complete search history.

(56) References Cited

U.S. PATENT DOCUMENTS

| | | | | |
|---|---|---|---|---|
| 3,699,317 A | * | 10/1972 | Middleditch | ................. 700/187 |
| 4,262,336 A | * | 4/1981 | Pritchard | ..................... 700/169 |
| 4,774,445 A | * | 9/1988 | Penkar | ..................... 318/568.18 |
| 5,025,385 A | * | 6/1991 | Froyd | ........................... 700/169 |
| 5,638,267 A | * | 6/1997 | Singhose et al. | ................ 700/28 |
| 2002/0156541 A1 | * | 10/2002 | Yutkowitz | ....................... 700/28 |
| 2003/0195643 A1 | * | 10/2003 | Knirck et al. | .................... 700/69 |
| 2005/0067995 A1 | * | 3/2005 | Weinhofer et al. | ........... 318/574 |

FOREIGN PATENT DOCUMENTS

| | | |
|---|---|---|
| JP | 05-341847 | 12/1993 |
| JP | 11-184530 | 7/1999 |

* cited by examiner

*Primary Examiner* — Albert Decady
*Assistant Examiner* — Tejal J Gami
(74) *Attorney, Agent, or Firm* — Stanzione & Kim, LLP

(57) ABSTRACT

A method of and apparatus to generate a position profile using lower-order polynomials. The device includes a pattern coefficient generator to generate pattern and time coefficients of a position pattern that is classified by velocity change, a contour generator to generate a pattern polynomial to define a contour of each section of the position pattern using the generated pattern and time coefficients, and a dual filter for generating a position profile by selectively activating one of a plurality of filters, which receive the pattern polynomial generated by the contour generator. The device uses lower-order polynomials and a small number of coefficients, thereby reducing the number of calculations required in the procedure to generate the position profile. The device generates a seamless and smooth position profile by preventing switching errors due to the difference between filter sizes.

17 Claims, 14 Drawing Sheets

METHOD AND DEVICE TO GENERATE POSITION PROFILE IN MOTION CONTROLLER

CROSS-REFERENCE TO RELATED APPLICATIONS

This application claims the benefit of Korean Patent Application No. 2004-85041, filed on Oct. 22, 2004 in the Korean Intellectual Property Office, the disclosure of which is incorporated herein in its entirety and by reference.

BACKGROUND OF THE INVENTION

1. Field of the Invention

The present general inventive concept relates to a method and device to generate a position profile using lower-order polynomials in a motion controller.

2. Description of the Related Art

An industrial articulated robot moves a work subject to a target position by rotating and moving its joints, and includes a servomotor as a drive source for moving each joint.

A motion controller generates a position profile using an input command and transfers it to a servo controller. The servo controller then controls the servomotor according to the position profile to move the work subject to the target position. The position profile is used to determine work pattern and time in controlling the servomotor of the articulated robot.

Methods for generating a position profile in the motion controller are typically based on integration or polynomials.

As shown in FIG. 1, the integration-based position profile generation method generates an acceleration/deceleration (acc/dec) pattern by integrating a jerk pattern, and generates a velocity pattern by integrating the acc/dec pattern, and then generates a position profile by integrating the velocity pattern.

It is relatively easy to implement the integration-based method. However, this method requires a large amount of variables to be stored for calculation in the integration procedure. It is also difficult for this method to implement asymmetrical acceleration/deceleration, and calculation errors may occur.

As shown in FIG. 2, the polynomial-based position profile generation method typically generates a position profile by selecting a polynomial from seven polynomials P(0) to P(6) for each section of the position profile according to the condition of each section. Here, a calculation for generating the position profile is performed for each section. For example, seven different types of sections of a position profile may be defined as the following seven 3rd-order polynomials P(0) to P(6) with time variables ($t^a$, a=0, 1, 2, 3) and coefficients ($C_{xy}$).

$$P(0) = C_{00} + C_{01}t + C_{02}t^2 + C_{03}t^3$$

$$P(1) = C_{10} + C_{11}t + C_{12}t^2$$

$$P(2) = C_{20} + C_{21}t + C_{22}t^2 + C_{23}t^3$$

$$P(3) = C_{30} + C_{31}t$$

$$P(4) = C_{40} + C_{41}t + C_{42}t^2 + C_{43}t^3$$

$$P(5) = C_{50} + C_{51}t + C_{52}t^2$$

$$P(6) = C_{60} + C_{61}t + C_{62}t^2 + C_{63}t^3$$

However, the conventional polynomial-based method requires a large number of coefficients for defining polynomials according to initial conditions, so that the calculation of the coefficients according to initial conditions is complicated, and a large amount of real-time calculation is needed.

SUMMARY OF THE INVENTION

The present general inventive concept provides a device to, and method of generating a position profile in a motion controller, which can not only provide an accurate calculation to generate the position profile, but can also reduce the amount of calculations required (i.e., the number of calculations).

Additional aspects and/or advantages of the present general inventive concept will be set forth in part in the description which follows and, in part, will be obvious from the description, or may be learned by practice of the general inventive concept.

The foregoing and/or other aspects and advantages of the present general inventive concept are achieved by providing a device to generate a position profile in a motion controller, the device including a pattern coefficient generator to generate pattern and time coefficients of a position pattern, the position pattern being classified by velocity change, a contour generator to generate a pattern polynomial to define a contour of each section of the position pattern using the pattern and time coefficients generated by the pattern coefficient generator, and a dual filter to generate a position profile by selectively activating one of a plurality of filters, which receive the pattern polynomial generated by the contour generator.

The pattern coefficient generator can compare an initial velocity of the position pattern with a reference velocity and can select one of a plurality of position patterns based on the comparison.

The contour generator generates a pattern polynomial, which is a 2nd-order function of time, for each of acceleration, constant-velocity, and deceleration sections of the position pattern.

The device further includes an initial condition calculator to provide an initial condition, required to determine the type of the position pattern, to the pattern coefficient generator.

The initial condition calculator provides an initial velocity of the position pattern to the pattern coefficient generator.

When receiving an update command to update the position profile with a subsequent position pattern, the initial condition calculator calculates an initial velocity of the subsequent position pattern, based on a pattern polynomial currently generated by and received from the contour generator so that the current position pattern is continued by the subsequent position pattern.

The dual filter can include an acceleration filter and a deceleration filter, and the acceleration filter is used to filter a pattern polynomial corresponding to an acceleration section of the position pattern, and the deceleration filter is used to filter a pattern polynomial corresponding to a deceleration section thereof.

The dual filter may further include a filter selector to select one of the acceleration and deceleration filters according to a 2nd-order coefficient of the pattern coefficients of the position pattern, and a switching portion to activate the one of the acceleration and deceleration filters selected by the filter selector.

The filter selector selects the acceleration filter if the 2nd-order coefficient is positive, and selects the deceleration filter if the 2nd-order coefficient is negative.

The dual filter may further include a flip-flop, connected between the filter selector and the switching portion, to maintain the selection of the filter.

If the acceleration and deceleration filters have different filter sizes, switching timing of one of the acceleration and deceleration filters, which has a relatively small filter size, is shifted in time with respect to switching timing of the other filter, which has a relatively large filter size, in order to prevent a switching error from occurring when the acceleration and deceleration filters are switched.

The filter having the relatively large filter size is designed as expressed by the following equation:

$$y_1[n] = \frac{1}{ma} \sum_{i=n-ma+1}^{n} x[i],$$

where "y1[n]" denotes a filter having a relatively large filter size, "ma" denotes the larger of two integer values "na" and "nd", "d" denotes the absolute value of (na−nd), "na" denotes the integer value of (Tra/Ts), "nd" denotes the integer value of (Trd/Ts), "Ts" denotes sampling time, "Tra" denotes the size of the acceleration filter and is expressed by (Acc/Jerk), "Trd" denotes the size of the deceleration filter and is expressed by (Dec/Jerk), "Jerk" denotes the magnitude of jerk, "Acc" denotes acceleration, and "Dec" denotes deceleration.

The filter having the relatively small filter size is designed as expressed by the following equation:

$$y_2[n] = \frac{1}{mi} \sum_{i=n-ma+d/2+1}^{n-d/2} x[i]$$

where "y2[n]" denotes a filter having a relatively small filter size, "ma" denotes the larger of two integer values "na" and "nd", "mi" denotes the larger of the two integer values "na" and "nd", "d" denotes the absolute value of (na−nd), "na" denotes the integer value of (Tra/Ts), "nd" denotes the integer value of (Trd/Ts), "Ts" denotes sampling time, "Tra" denotes the size of the acceleration filter and is expressed by (Acc/Jerk), "Trd" denotes the size of the deceleration filter and is expressed by (Dec/Jerk), "Jerk" denotes the magnitude of jerk, "Acc" denotes acceleration, and "Dec" denotes deceleration.

The device may further include a motion buffer to temporarily store information produced by both the initial condition calculator and the pattern coefficient generator, and a motion buffer manager to control the motion buffer to store the information.

The foregoing and/or other aspects and advantages of the present general inventive concept may also be achieved by providing a method of generating a position profile in a motion controller, the method including selecting one of a plurality of position patterns produced based on velocity change, generating pattern and time coefficients of the selected position pattern, generating a pattern polynomial to define a contour of each section of the position pattern using the generated pattern and time coefficients, and generating a position profile by selectively activating one of a plurality of filters, which receive the generated pattern polynomial.

The selection of one of the plurality of position patterns may include comparing an initial velocity of the position pattern with a reference velocity, selecting one of a plurality of position pattern groups based on the comparison, and selecting one of a plurality of position patterns, which belong to the selected position pattern group, according to a given target position.

The selective activation of one of the plurality of filters may include activating an acceleration filter when receiving a pattern polynomial corresponding to an acceleration section of the position pattern, activating a deceleration filter when receiving a pattern polynomial corresponding to a deceleration section of the position pattern, and maintaining the activation of a previously activated filter when receiving a pattern polynomial corresponding to a constant-velocity section of the position pattern.

BRIEF DESCRIPTION OF THE DRAWINGS

These and/or other aspects and advantages of the general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
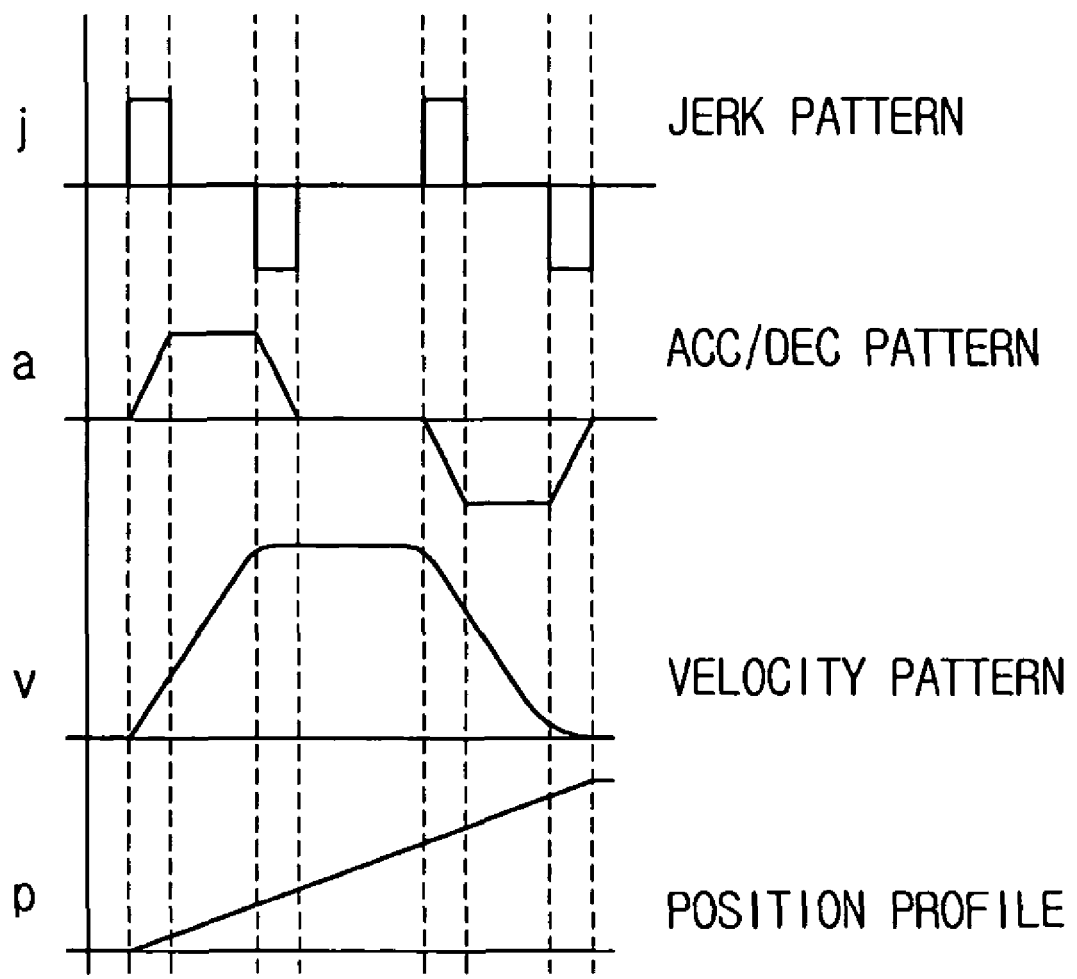
FIG. 1 is a schematic diagram illustrating a conventional integration-based method for generating a position profile.
Figure 2:
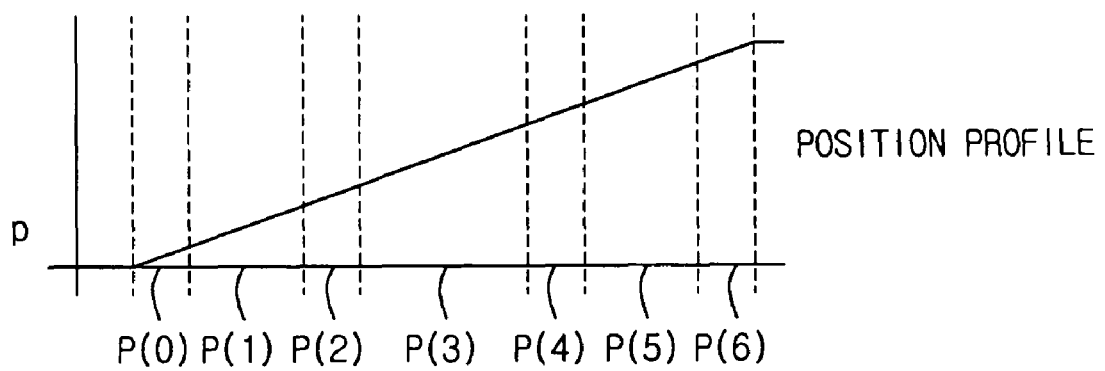
FIG. 2 is a schematic diagram illustrating a conventional polynomial-based method for generating a position profile.

Reference will now be made in detail to the embodiments of the present general inventive concept, examples of which are illustrated in the accompanying drawings, wherein like reference numerals refer to the like elements throughout. The embodiments are described below to explain the present general inventive concept by referring to the figures.

Figure 3:
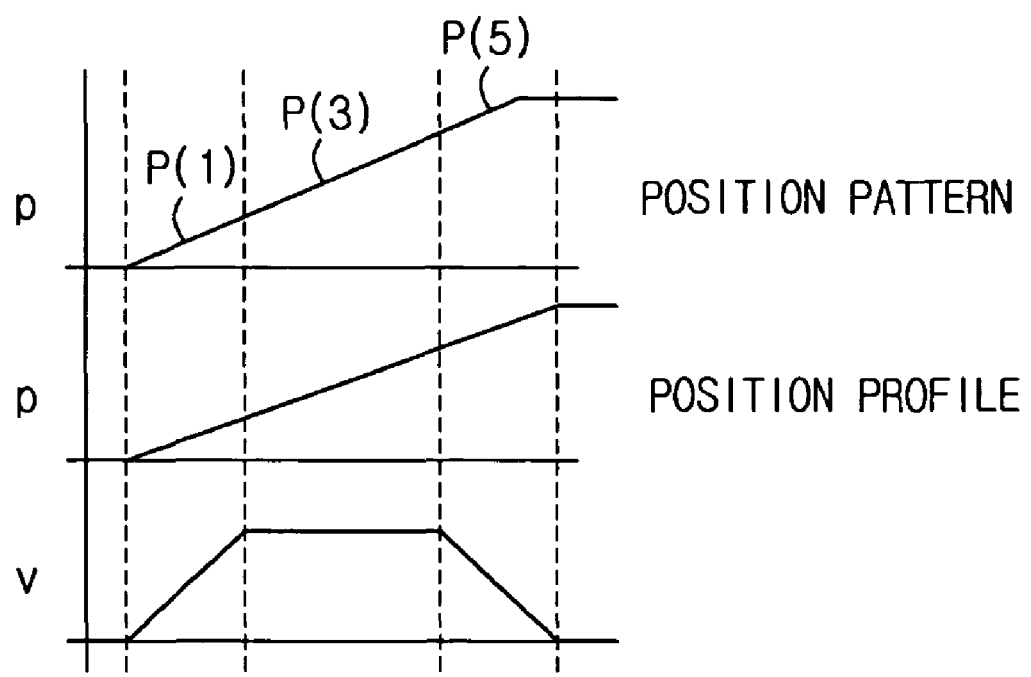
FIG. 3 is a schematic diagram illustrating a method of generating a position profile from a position pattern according to an embodiment of the present general inventive concept.
Figure 4:
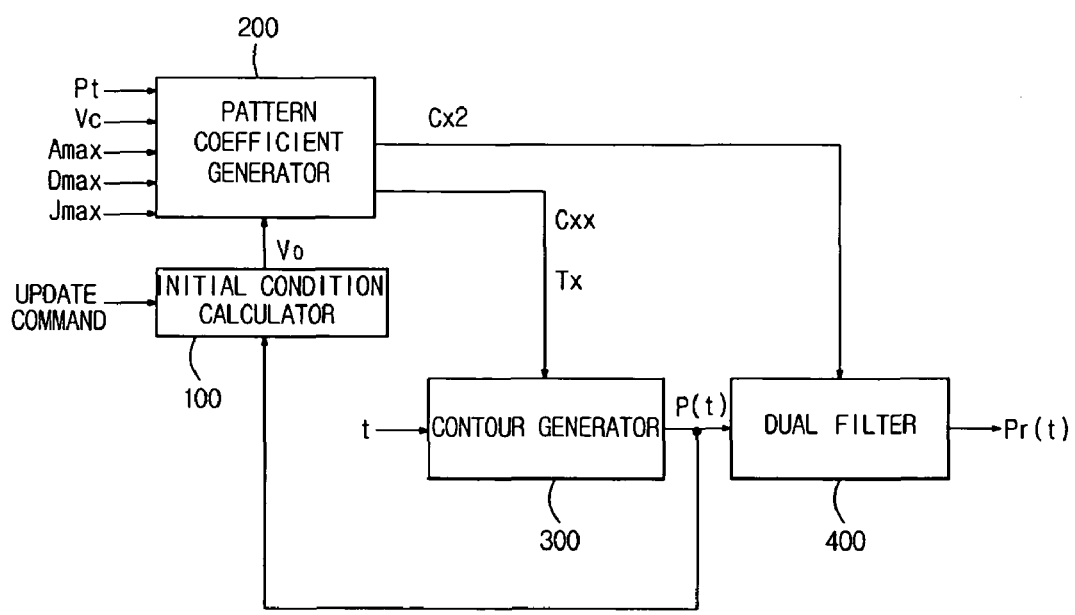
FIG. 4 is a block diagram of a position profile generation device in a motion controller according to an embodiment of the present general inventive concept.

FIG. 3 is a schematic diagram illustrating how a position profile is generated from a position pattern according to an embodiment of the present general inventive concept, and FIG. 4 is a block diagram of a position profile generation device in a motion controller according to an embodiment of the present general inventive concept.

The present general inventive concept provides a method of generating a position profile by passing position patterns selected based on initial conditions through a dual filter. A position pattern is defined based on velocity change as time passes. Specifically, a position pattern may include, for example, three types of sections that are defined respectively by the following three 2nd-order polynomials: a pattern polynomial P(1) for acceleration sections, a pattern polynomial P(3) for constant-velocity sections, and a pattern polynomial P(5) for deceleration sections.

$$P(1)=C_{10}+C_{11}t+C_{12}t^2$$

$$P(3)=C_{30}+C_{31}t$$

$$P(5)=C_{50}+C_{51}t+C_{52}t^2$$

That is, according to the present general inventive concept, position patterns are divided into three types of sections according to velocity change, which correspond respectively to the three above polynomials. When compared to the conventional polynomial-based method in which a position profile is divided into seven types of sections according to velocity change, the position profile generation method according to the present general inventive concept reduces the degree of polynomials required to define a position profile from 3rd-order polynomials to 2nd-order polynomials, and also reduces the number of polynomials required to define a position profile from 7 to 3, thereby reducing the amount of real-time calculation.

A dual filter according to an embodiment of the present general inventive concept, which produces a position profile from position patterns, includes a deceleration filter that is activated for deceleration sections and an acceleration filter that is activated for acceleration sections.

As shown in FIG. 4, a position profile generation device in a motion controller according to the present embodiment includes an initial condition calculator 100, a pattern coefficient generator 200, a contour generator 300, and a dual filter 400.

The initial condition calculator 100 provides an initial velocity $V_o$ to the pattern coefficient generator 200. The pattern coefficient generator 200 compares the initial velocity $V_0$ with a reference velocity $V_c$ received from a command input unit, selects one of a plurality of position patterns based on the comparison, and provides coefficients required to define the selected position pattern to the contour generator 300. The position pattern selection will now be described in detail with reference to FIGS. 5A to 5E.

Figure 5A:
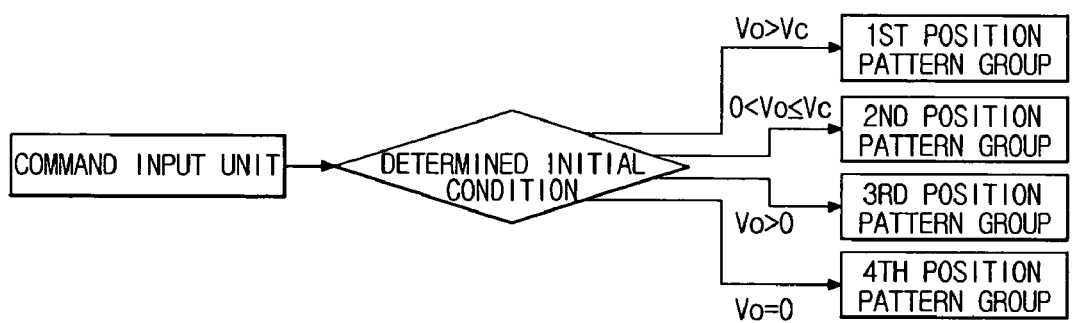
FIG. 5A is a diagram illustrating how a position pattern group is selected from a plurality of position pattern groups according to an initial condition provided from a command input unit, according to an embodiment of the present general inventive concept.

As shown in FIG. 5A, a position pattern group is selected from four position pattern groups, based on an initial condition provided through the command input unit. The first position pattern group (Pattern Group 1) is selected when the initial velocity $V_o$ is greater than the reference velocity $V_c$, the second position pattern group (Pattern Group 2) is selected when the initial velocity $V_o$ is greater than 0 and less than or equal to the reference velocity $V_c$, the third position pattern group (Pattern Group 3) is selected when the initial velocity $V_o$ is greater than 0, and the fourth position pattern group (Pattern Group 4) is selected when the initial velocity $V_o$ is zero.

Each of the first to fourth position pattern groups includes a plurality of position patterns, which will be described in detail assuming that the target position Pt is more than or equal to 0 (Pt≧0).

Figure 5B:
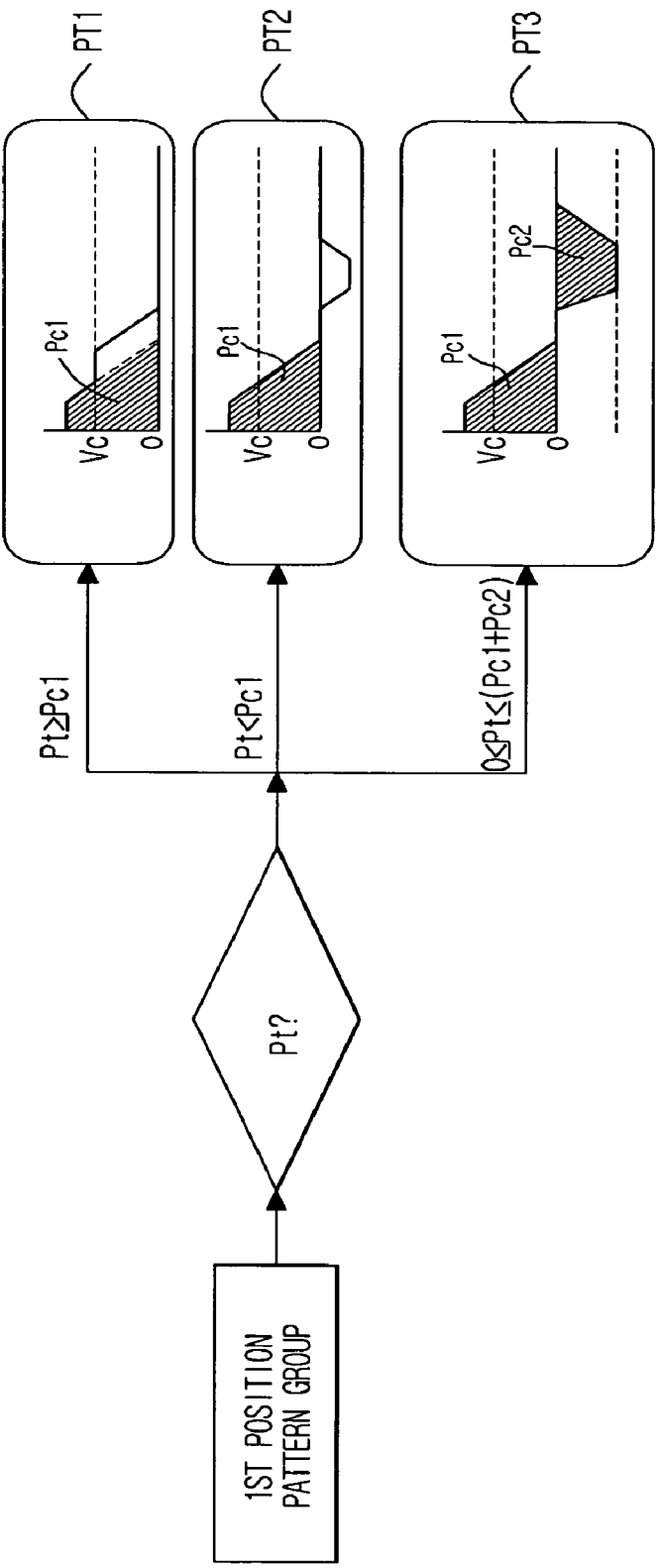
FIG. 5B is a diagram illustrating how a position pattern is selected from a first position pattern group according to a target position, according to an embodiment of the present general inventive concept.

As shown in FIG. 5B, a first position pattern PT1 is selected when the target position Pt is more than or equal to a first set position Pc1 (Pt≧Pc1). The first position pattern PT1 has a velocity change form of constant velocity-deceleration-constant velocity-deceleration-constant velocity. A second position pattern PT2 is selected when the target position Pt is less than the first set position Pc1 (Pt<Pc1). The second position pattern PT2 has a velocity change form of constant velocity-deceleration-constant velocity-deceleration-constant velocity-acceleration-constant velocity. A third position pattern PT3 is selected when the target position Pt is more than or equal to 0 and less than or equal to the sum (Pc1+Pc2) of the first and second set positions Pc1 and Pc2 (0≦Pt≦(Pc1+Pc2)). The third position pattern PT3 has a velocity change form of constant velocity-deceleration-constant velocity-deceleration-constant velocity-acceleration-constant velocity.

Figure 5C:
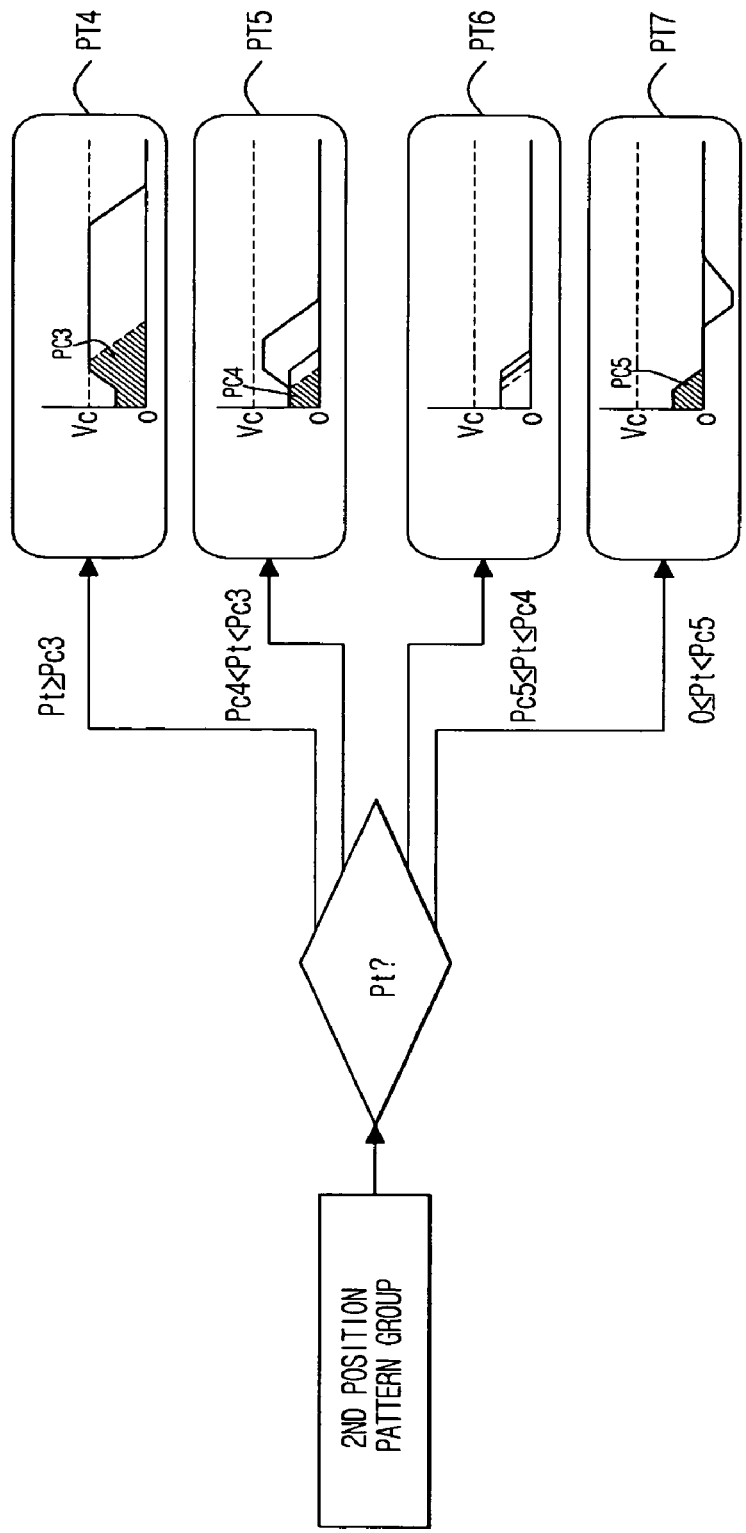
FIG. 5C is a diagram illustrating how a position pattern is selected from a second position pattern group according to a target position, according to an embodiment of the present general inventive concept.

As shown in FIG. 5C, a fourth position pattern PT4 is selected when the target position Pt is more than or equal to a third set position Pc3 (Pt≧Pc3). The fourth position pattern PT4 has a velocity change form of constant velocity-acceleration-constant velocity-deceleration-constant velocity. A fifth position pattern PT5 is selected when the target position Pt is more than a fourth set position Pc4 and less than the third set position (Pc4<Pt<Pc3). The fifth position pattern PT5 has a velocity change form of constant velocity-acceleration-constant velocity-deceleration-constant velocity. A sixth position pattern PT6 is selected when the target position Pt is more than or equal to a fifth set position Pc5 and less than or equal to the fourth set position Pc4 (Pc5≦Pt≦Pc4). The sixth position pattern PT6 has a velocity change form of constant velocity-deceleration-constant velocity. A seventh position pattern PT7 is selected when the target position Pt is more than or equal to 0 and less than the fifth set position Pc5 (0≦Pt>Pc5). The seventh position pattern PT7 has a velocity change form of constant velocity-deceleration-constant velocity-deceleration-constant velocity-acceleration-constant velocity.

Figure 5D:
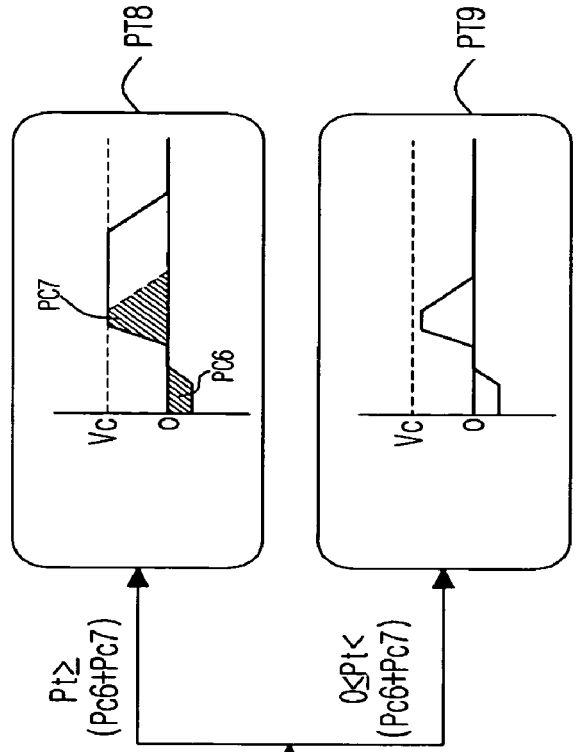
FIG. 5D is a diagram illustrating how a position pattern is selected from a third position pattern group according to a target position, according to an embodiment of the present general inventive concept.

As shown in FIG. 5D, an eighth position pattern PT8 is selected when the target position Pt is more than or equal to the sum (Pc6+Pc7) of sixth and seventh set positions Pc6 and Pc7 (Pt≧Pc6+Pc7). The eighth position pattern PT8 has a velocity change form of constant velocity-acceleration-constant velocity-acceleration-constant velocity-deceleration-constant velocity. A ninth position pattern PT9 is selected when the target position Pt is more than or equal to 0 and less than the sum (Pc6+Pc7) of the sixth and seventh set positions Pc6 and Pc7 (0≦Pt<Pc6+Pc7). The ninth position pattern PT9 has a velocity change form of constant velocity-acceleration-constant velocity-acceleration-constant velocity-deceleration-constant velocity.

Figure 5E:
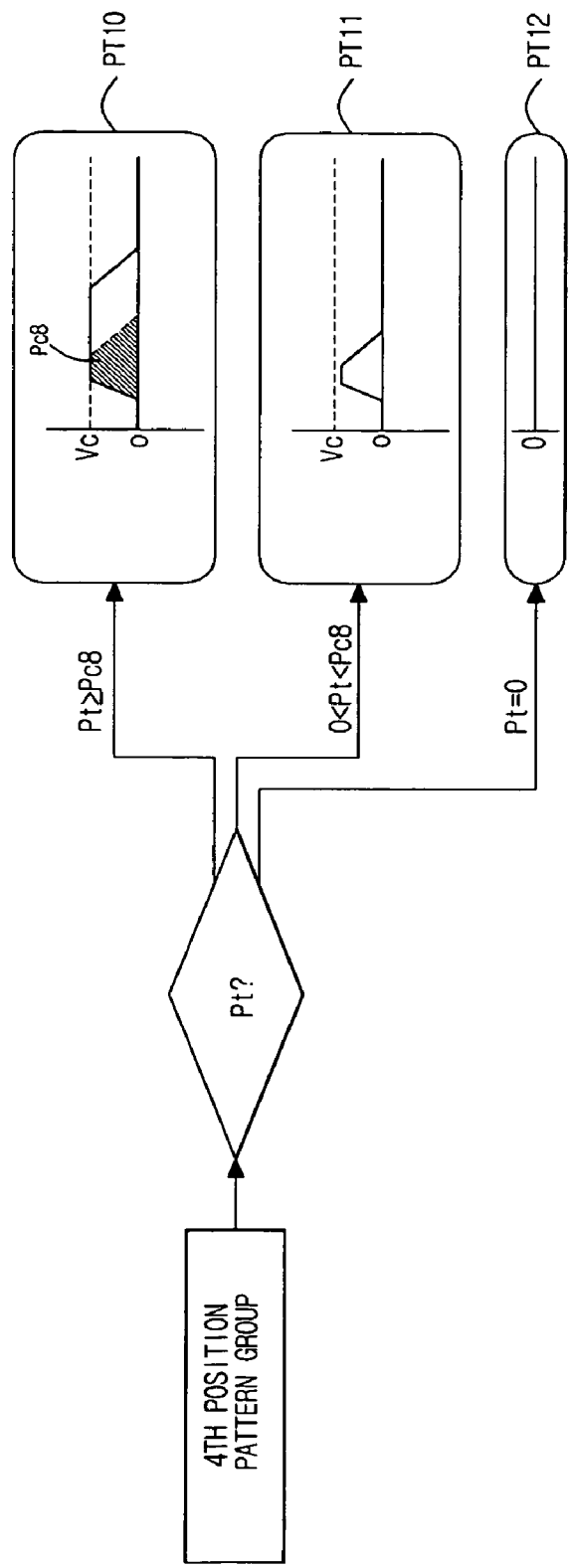
FIG. 5E is a diagram illustrating how a position pattern is selected from a fourth position pattern group according to a target position, according to an embodiment of the present general inventive concept.

As shown in FIG. 5E, a tenth position pattern PT10 is selected when the target position Pt is more than or equal to an eighth set position (Pt≧Pc8). The tenth position pattern PT10 has a velocity change form of constant velocity-acceleration-constant velocity-deceleration-constant velocity. An eleventh position pattern PT11 is selected when the target position Pt is more than 0 and less than the eighth set position (0<Pt<Pc8). The eleventh position pattern PT11 has a velocity change form of constant velocity-acceleration-constant velocity-deceleration-constant velocity. A twelfth position pattern PT12 indicates that no operation is required (Pt=0).

The first to eleventh position patterns PT1 to PT11 correspond to target positions Pt more than zero (Pt>0). 13th to 23rd position patterns corresponding to target positions Pt less than zero (Pt<0), which are not shown, can be obtained by inverting the first to eleventh position patterns PT1 to PT11 about the horizontal axis. Accordingly, a total of 23 position patterns can be used in the present general inventive concept.

After completing the selection of a position pattern based on the initial condition, the pattern coefficient generator 200 generates pattern coefficients Cxx of the selected position pattern and time coefficients Tx of the sections thereof using a motion command, which contains a target position Pt, a reference velocity $V_c$, a reference acceleration Amax, a reference deceleration Dmax, and a reference jerk Jmax, and provides the generated pattern coefficients Cxx and time coefficients Tx to the contour generator 300.

The contour generator 300 generates a pattern polynomial P(t) for each section of the selected position pattern using time variables t and the pattern coefficients Cxx and time coefficients Tx received from the pattern coefficient generator 200, and provides the generated pattern polynomial P(t) to the dual filter 400. In other words, for each section of the selected position pattern, the contour generator 300 generates one of the three types of pattern polynomials according to the type of each section thereof, and provides the generated pattern polynomial to the dual filter 400. For example, pattern polynomials corresponding to the fourth position pattern PT4, which has a velocity change form of constant velocity-acceleration-constant velocity-deceleration-constant velocity, are "P(3)-P(1)-P(3)-P(5)-P(3)", and the corresponding time coefficients are "T(3)-T(1)-T(3)-T(5)-T(3)".

The dual filter 400 receives the pattern polynomial P(t), and generates a position profile Pr(t) by switching to one of a plurality of filters according to a 2nd-order coefficient Cx2 received from the pattern coefficient generator 200.

Figure 6:
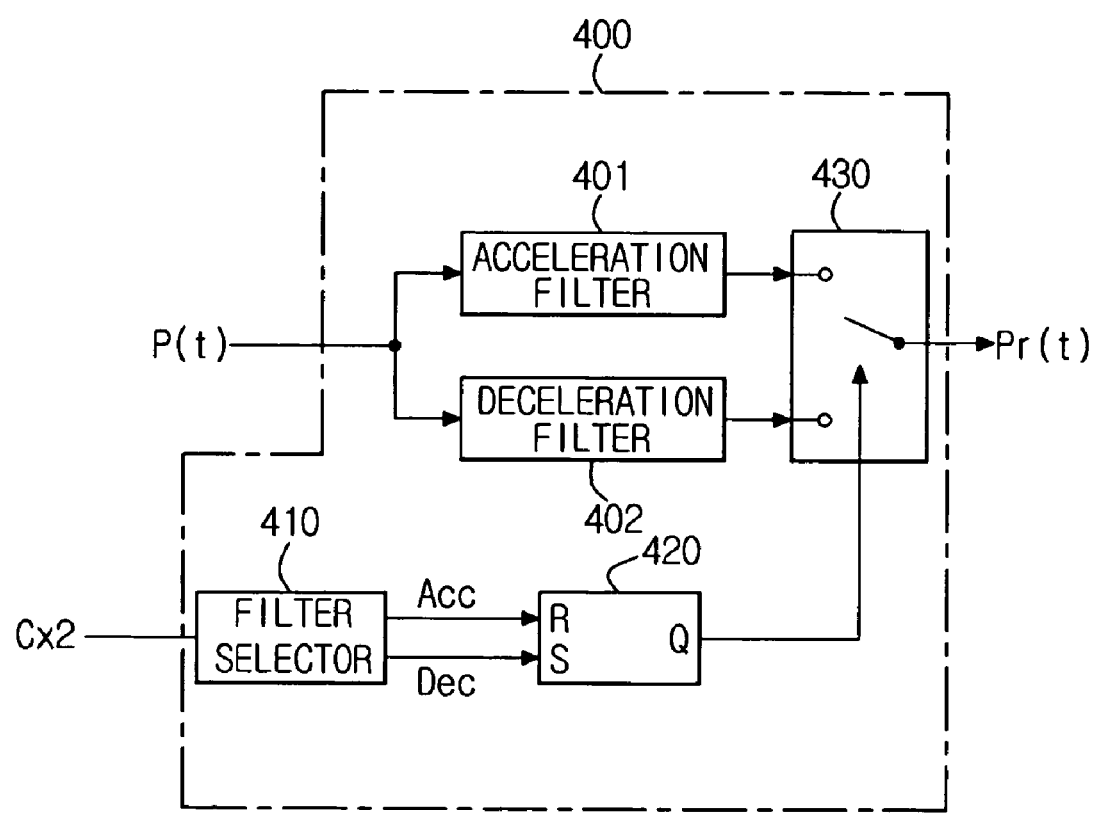
FIG. 6 is a detailed block diagram of a dual filter according to an embodiment of the present general inventive concept.

In detail, as shown in FIG. 6, the dual filter 400 includes an acceleration filter 401, a deceleration filter 402, a filter selector 410, a flip-flop 420, and a switching portion 430. The pattern polynomial P(t) generated by the contour generator 300 is input to both the acceleration and deceleration filters 401 and 402, the outputs of which are connected to the switching portion 430. The filter selector 410 receives the 2nd-order coefficient Cx2 from the pattern coefficient generator 200, and outputs a filter selection signal to select one of the acceleration and deceleration filters 401 and 402 according to the received 2nd-order coefficient Cx2. A 2nd-order coefficient Cx2 having a positive sign (+) indicates an acceleration section, and a 2nd-order coefficient Cx2 having a negative sign (+) indicates a deceleration section. Therefore, if the 2nd-order coefficient Cx2 received from the pattern coefficient generator 200 is positive, the filter selector 410 outputs an Acc signal of "1" and a Dec signal of "0" to the flip-flop 420 so that the switching portion 430 is switched to the acceleration filter 401. If the 2nd-order coefficient Cx2 is negative, the filter selector 410 outputs an Acc signal of "0" and a Dec signal of "1" to the flip-flop 420 so that the switching portion 430 is switched to the deceleration filter 402. The flip-flop 420 provides a switching signal, corresponding to the filter selection signal received from the filter selector 410, to the switching portion 430, and the switching portion 430 is switched to one of the acceleration and deceleration filters 401 and 402 according to the corresponding switching signal.

Figure 7:
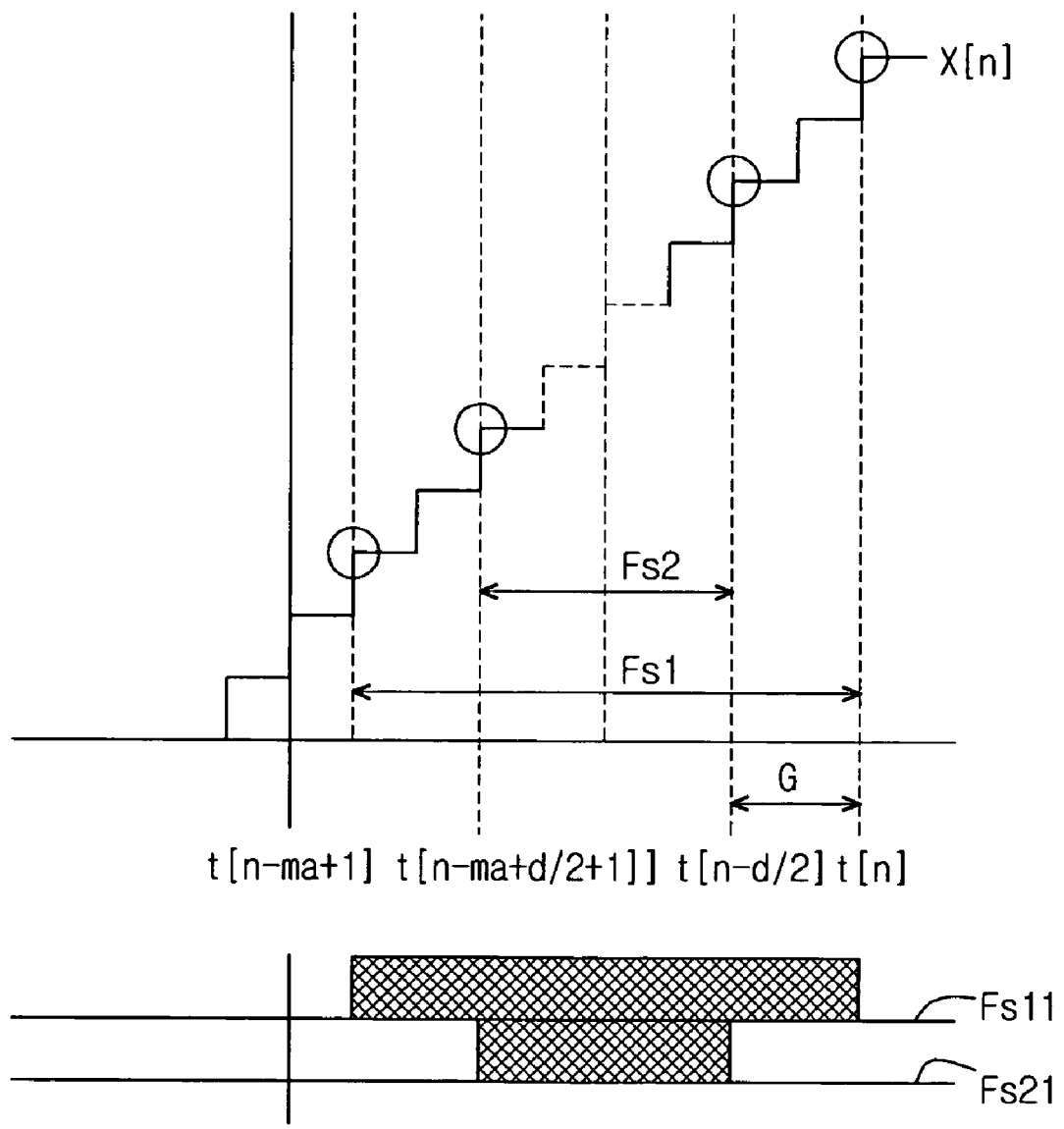
FIG. 7 is a diagram illustrating switching timing of acceleration and deceleration filters in the dual filter, according to an embodiment of the present general inventive concept.

The filter sizes of the acceleration and deceleration filters vary depending on acceleration conditions (for example, a reference acceleration value Amax) and deceleration conditions (for example, a reference deceleration value Dmax). FIG. 7 illustrates switching timing of the acceleration and deceleration filters in the dual filter when the filter size Fs2 of the acceleration filter is less than the filter size Fs1 of the deceleration filter. As shown in FIG. 7, switching of the acceleration and deceleration filters must be performed such that the switching timing of the acceleration filter 401 is shifted in time with respect to the switching timing of the deceleration filter 402 by a time interval "G" corresponding to a half of the difference between the two filter sizes Fs1 and Fs2.

If the filter size difference is not taken into consideration, a switching error may occur in the procedure of switching the acceleration and deceleration filters, thereby making the positional movement unstable.

To prevent the switching error, filter integers are obtained and acceleration and deceleration filters are designed using the filter integers as expressed in Equations 1 to 9.

$$T_{ra} = \frac{Acc}{\text{Jerk}}, \tag{1}$$

where "$T_{ra}$" denotes the size of the acceleration filter, "Jerk" denotes the magnitude of jerk, and "Acc" denotes acceleration.

$$na = int\left(\frac{T_{ra}}{T_s}\right), \tag{2}$$

where "$T_s$" is sampling time, and "na" is the integer value of ($T_{ra}/T_s$).

$$T_{rd} = \frac{Dec}{\text{Jerk}}, \tag{3}$$

where "$T_{rd}$" denotes the size of a deceleration filter, and "Jerk" denotes the magnitude of jerk.

$$nd = int\left(\frac{T_{rd}}{T_s}\right), \tag{4}$$

where "$T_s$" denotes sampling time, and "nd" denotes the integer value of ($T_{rd}/T_s$).

$$ma = \max(na, nd) \tag{5}$$

where "ma" denotes the larger of the two integer values "na" and "nd".

$$mi = \max(na, nd), \tag{6}$$

where "mi" denotes the larger of the two integer values "na" and "nd".

$$d = abs(na - nd) \tag{7}$$

where "d" denotes the absolute value of (na−nd).

As expressed by Equations 8 and 9, two filters are obtained using the above filter integers.

$$y_1[n] = \frac{1}{ma} \sum_{i=n-ma+1}^{n} x[i] \qquad (8)$$

$$y_2[n] = \frac{1}{mi} \sum_{i=n-ma+d/2+1}^{n-d/2} x[i] \qquad (9)$$

Here, "$y_1[n]$" corresponds to a filter having a relatively large filter size, and "$y_2[n]$" corresponds to a filter having a relatively small filter size.

If, while a position profile is generated using a position pattern, it is desired to update the position profile with a new position pattern, a corresponding update command is provided from the command input unit to the initial condition calculator 100. According to the update command, the initial condition calculator 100 receives a pattern polynomial P(t) currently output from the contour generator 300, and calculates an initial velocity $V_o$ of the new position pattern as an initial condition thereof, based on velocity, acceleration, and position values of the currently output pattern polynomial P(t) (for example, the last velocity, acceleration, and position values thereof). The initial condition calculator 100 provides the calculated initial velocity $V_o$ to the pattern coefficient generator 200, thereby updating the position pattern with the new position pattern.

Figure 8A:
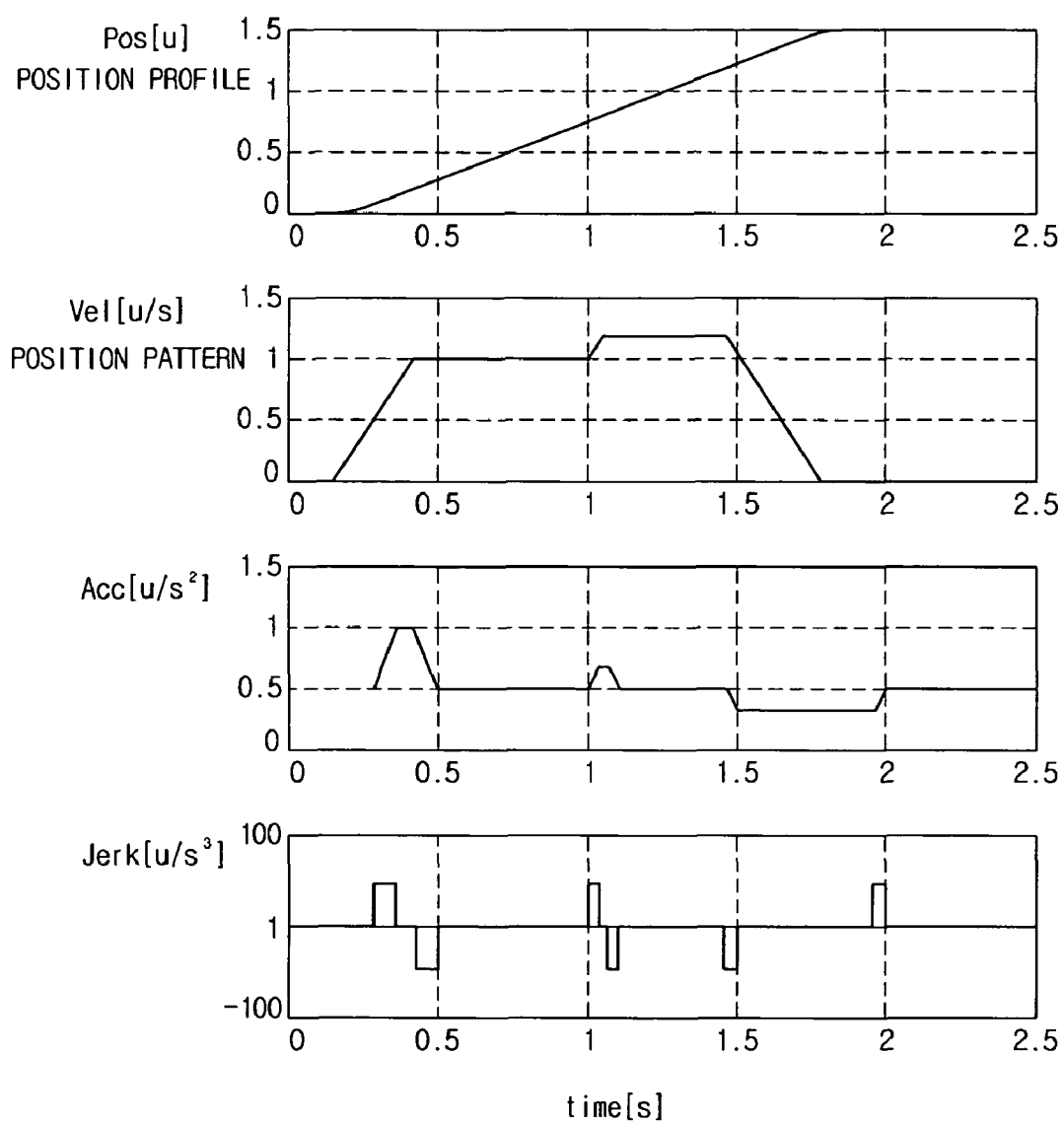
FIG. 8A is a diagram illustrating how a position profile produced using a 10th position pattern is updated with a 4th position pattern, according to an embodiment of the present general inventive concept.
Figure 8B:
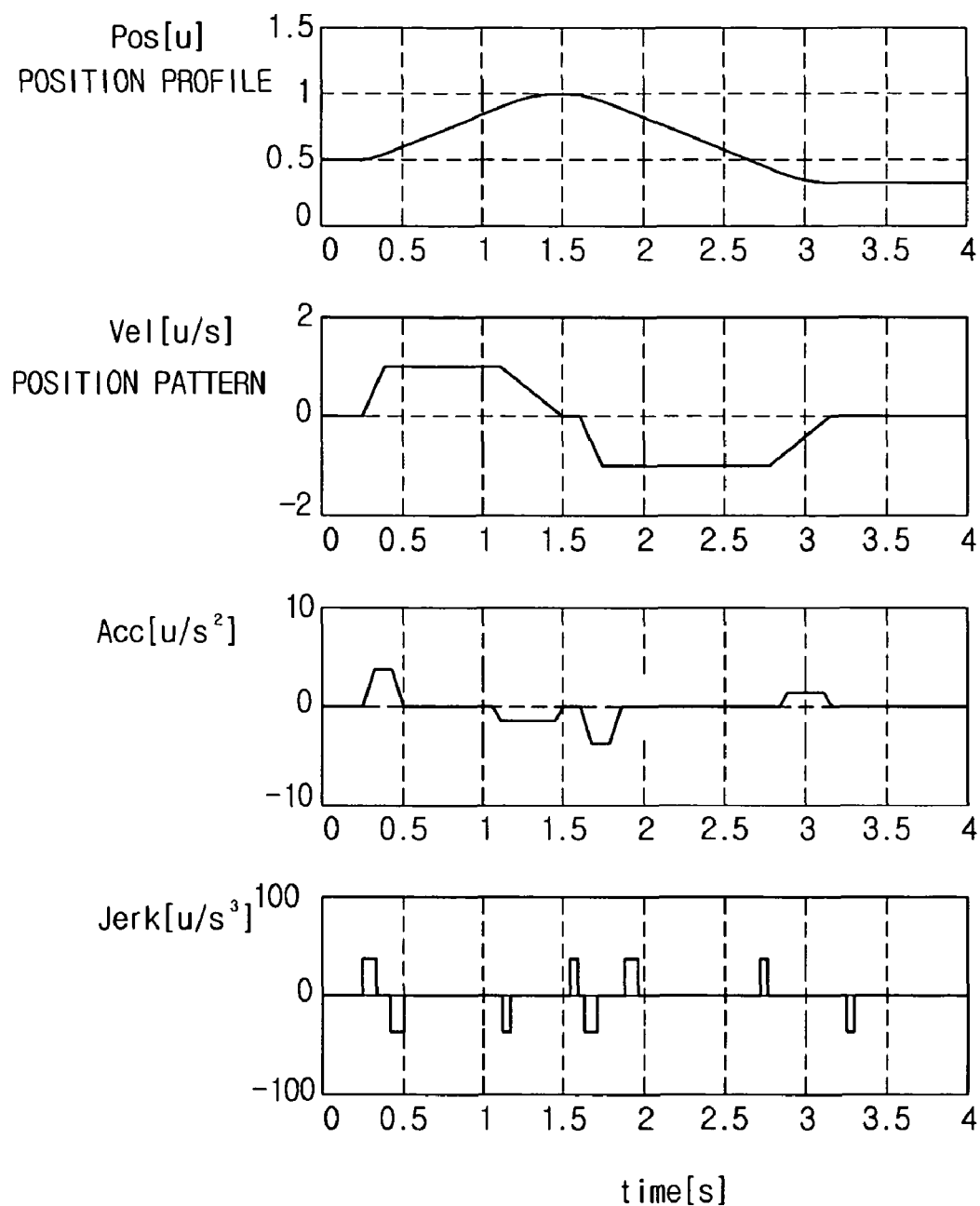
FIG. 8B is a diagram illustrating how a position profile produced using a 10th position pattern is updated with a 7th position pattern, according to an embodiment of the present general inventive concept.

As one example, when the position profile "Pos" is updated from the tenth position pattern to the fourth position pattern, the fourth position pattern is continued one second later from the beginning of the position profile, and the resulting position profile "Pos" shows a seamless and smooth position change as shown in FIG. 8A. As another example, when the position profile "Pos" is updated from the tenth position pattern to the seventh position pattern, the seventh position pattern is continued one second later from the beginning of the position profile, and the resulting position profile "Pos" shows a seamless and smooth position change as shown in FIG. 8B.

Figure 9:
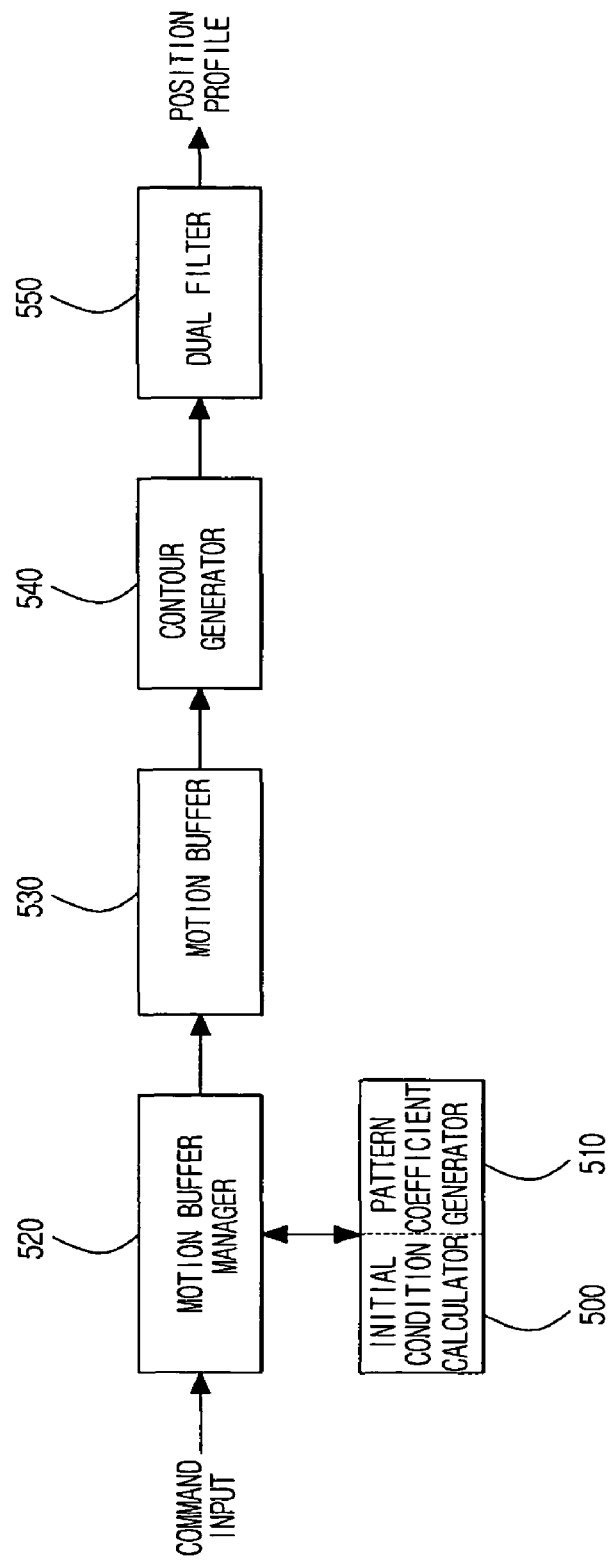
FIG. 9 is a block diagram of a position profile generation device according to another embodiment of the present general inventive concept, which uses a motion buffer to generate a position profile while continually updating it with a plurality of position patterns.

In another embodiment of the present general inventive concept, a motion buffer is used to generate a position profile while continually updating it with a plurality of position patterns. FIG. 9 is a block diagram of an example position profile generation device according to this embodiment.

In FIG. 9, the position profile generation device comprises an initial condition calculator 500, a pattern coefficient generator 510, a motion buffer manager 520, a motion buffer 530, a contour generator 540, and a dual filter 550. The motion buffer manager 520 controls the operation of the motion buffer 530 to store pattern coefficients, time coefficients, and an initial condition according to a corresponding command received from a command input unit. The motion buffer 530 transfers the initial condition, the pattern coefficients, and the time coefficients, provided from the initial condition calculator 500 and the pattern coefficient generator 510, to the contour generator 540 after temporarily storing them. The contour generator 540 generates and provides a corresponding pattern polynomial to the dual filter 550. When receiving a command to update the position profile with a different position pattern, the motion buffer manager 520 controls the operation of the motion buffer 530 to temporarily store an initial condition, pattern coefficients, and time coefficients corresponding to the different position pattern, so as to generate a position profile with continuous position patterns.

As is apparent from the above description, the present general inventive concept provides a device to, and method of generating a position profile in a motion controller, which has the following features and advantages.

Various position patterns are generated according to initial conditions, and a position profile is generated from the various position patterns.

Lower-order polynomials and a small number of coefficients are used, thereby reducing the amount of calculations (i.e., the number of calculations) required in the procedure to generate the position profile.

Filters are designed using filter integers, which are obtained taking into consideration filter sizes, so that switching errors are prevented from occurring due to the difference between the filter sizes, thereby generating a seamless and smooth position profile.

Although a few embodiments of the present general inventive concept have been shown and described, it would be appreciated by those skilled in the art that changes may be made in these embodiments without departing from the principles and spirit of the general inventive concept, the scope of which is defined in the claims and their equivalents.

What is claimed is:

1. A device to generate a position profile in a motion controller, the device comprising:
    a pattern coefficient generator to generate pattern and time coefficients of a position pattern, the position pattern being classified by velocity change;
    a contour generator to generate a pattern polynomial to define a contour of each section of the position pattern using the pattern and time coefficients generated by the pattern coefficient generator; and
    a dual filter to generate a position profile by selectively activating one of a plurality of filters, which receive the pattern polynomial generated by the contour generator,
    wherein the dual filter comprises an acceleration filter and a deceleration filter,
    wherein the filter having the relatively large filter size is designed as expressed by the following equation 1 and the filter having the relatively small filter size is designed as expressed by the following equation 2:

$$y_1[n] = \frac{1}{ma} \sum_{i=n-ma+1}^{n} x[i] \qquad \text{(Equation 1)}$$

$$y_2[n] = \frac{1}{mi} \sum_{i=n-ma+d/2+1}^{n-d/2} x[i] \qquad \text{(Equation 2)}$$

where "$y_1[n]$" denotes a filter having a relatively large filter size, "$y_2[n]$" denotes a filter having a relatively small filter size, "ma" and "mi" denote the larger of two integer values "na" and "nd", "d" denotes the absolute value of (na−nd), "na" denotes the integer value of ($T_{ra}/T_s$), "nd" denotes the integer value of ($T_{rd}/T_s$), "$T_s$" denotes sampling time, "$T_{ra}$" denotes the size of the acceleration filter and is expressed by (Acc/Jerk), "$T_{rd}$" denotes the size of the deceleration filter and is expressed by (Dec/Jerk), "Jerk" denotes the magnitude of jerk, "Acc" denotes acceleration, and "Dec" denotes deceleration,
    wherein the acceleration filter is used to filter a pattern polynomial corresponding to an acceleration section of the position pattern, and the deceleration filter is used to filter a pattern polynomial corresponding to a deceleration section thereof, wherein if the acceleration and deceleration filters have different filter sizes, switching timing of one of the acceleration and deceleration filters, which has a relatively small filter size, is shifted in time with respect to switching timing of the other filter, which has a relatively large filter size, in order to prevent a switching error from occurring when the acceleration and deceleration filters are switched, and wherein the position profile controls a servomotor as a drive source to move each joint of an industrial articulated robot by determining work pattern and time.

2. The device according to claim 1, wherein the pattern coefficient generator compares an initial velocity of the position pattern with a reference velocity and selects one of a plurality of position patterns based on the comparison.

3. The device according to claim 1, wherein the contour generator generates a pattern polynomial, which is a 2nd-order function of time, for each of acceleration, constant-velocity, and deceleration sections of the position pattern.

4. The device according to claim 1, further comprising an initial condition calculator to provide an initial condition, required to determine the type of the position pattern, to the pattern coefficient generator.

5. The device according to claim 4, wherein the initial condition calculator provides an initial velocity of the position pattern to the pattern coefficient generator.

6. The device according to claim 5, wherein when receiving an update command to update the position profile with a subsequent position pattern, the initial condition calculator calculates an initial velocity of the subsequent position pattern, based on a pattern polynomial currently generated by and received from the contour generator so that the current position pattern is continued by the subsequent position pattern.

7. The device according to claim 1, wherein the dual filter further comprises:
 a filter selector to select one of the acceleration and deceleration filters according to a 2nd-order coefficient of the pattern coefficients of the position pattern; and
 a switching portion to activate the one of the acceleration and deceleration filters selected by the filter selector.

8. The device according to claim 7, wherein the filter selector selects the acceleration filter if the 2nd-order coefficient is positive, and selects the deceleration filter if the 2nd-order coefficient is negative.

9. The device according to claim 7, wherein the dual filter further comprises a flip-flop, connected between the filter selector and the switching portion, to maintain the selection of the filter.

10. The device according to claim 4, further comprising:
 a motion buffer to temporarily store information produced by both the initial condition calculator and the pattern coefficient generator; and
 a motion buffer manager to control the motion buffer to store the information.

11. A method of generating a position profile in a motion controller, the method comprising:
 selecting one of a plurality of position patterns produced based on velocity change;
 generating pattern and time coefficients of the selected position pattern;
 generating a pattern polynomial to define a contour of each section of the position pattern using the generated pattern and time coefficients; and
 generating a position profile by selectively activating one of a plurality of filters, which receive the generated pattern polynomial, wherein the plurality of filters comprise an acceleration filter and a deceleration filter, wherein the filter having the relatively large filter size is designed as expressed by the following equation 1 and the filter having the relatively small filter size is designed as expressed by the following equation 2:

$$y_1[n] = \frac{1}{ma} \sum_{i=n-ma+1}^{n} x[i],$$ (Equation 1)

$$y_2[n] = \frac{1}{mi} \sum_{i=n-ma+d/2+1}^{n-d/2} x[i]$$ (Equation 2)

where "$y_1[n]$" denotes a filter having a relatively large filter size, "$y_2[n]$" denotes a filter having a relatively small filter size, "ma" and "mi" denote the larger of two integer values "na" and "nd", "d" denotes the absolute value of (na−nd), "na" denotes the integer value of ($T_{ra}/T_s$), "nd" denotes the integer value of ($T_{rd}/T_s$), "$T_s$" denotes sampling time, "$T_{ra}$" denotes the size of the acceleration filter and is expressed by (Acc/Jerk), "$T_{rd}$" denotes the size of the deceleration filter and is expressed by (Dec/Jerk), "Jerk" denotes the magnitude of jerk, "Acc" denotes acceleration, and "Dec" denotes deceleration, wherein the acceleration filter is used to filter a pattern polynomial corresponding to an acceleration section of the position pattern, and the deceleration filter is used to filter a pattern polynomial corresponding to a deceleration section thereof, wherein if the acceleration and deceleration filters have different filter sizes, switching timing of one of the acceleration and deceleration filters, which has a relatively small filter size, is shifted in time with respect to switching timing of the other filter, which has a relatively large filter size, in order to prevent a switching error from occurring when the acceleration and deceleration filters are switched, and wherein the position profile controls a servomotor as a drive source to move each joint of an industrial articulated robot by determining work pattern and time.

12. The method according to claim 11, wherein the selection of one of the plurality of position patterns comprises:
 comparing an initial velocity of the position pattern with a reference velocity;
 selecting one of a plurality of position pattern groups based on the comparison; and
 selecting one of a plurality of position patterns, which belong to the selected position pattern group, according to a given target position.

13. The method according to claim 11, wherein the selective activation of one of the plurality of filters comprises:
 activating an acceleration filter when receiving a pattern polynomial corresponding to an acceleration section of the position pattern;
 activating a deceleration filter when receiving a pattern polynomial corresponding to a deceleration section of the position pattern; and
 maintaining the activation of a previously activated filter when receiving a pattern polynomial corresponding to a constant-velocity section of the position pattern.

14. A computer readable storage medium containing a method of generating a position profile in a motion controller, the method comprising:

selecting one of a plurality of position patterns produced based on velocity change;

generating pattern and time coefficients of the selected position pattern;

generating a pattern polynomial to define a contour of each section of the position pattern using the generated pattern and time coefficients; and generating a position profile by selectively activating one of a plurality of filters, which receive the generated pattern polynomial, wherein the plurality of filters comprise an acceleration filter and a deceleration filter, wherein the filter having the relatively large filter size is designed as expressed by the following equation 1 and the filter having the relatively small filter size is designed as expressed by the following equation 2.

$$y_1[n] = \frac{1}{ma} \sum_{i=n-ma+1}^{n} x[i] \quad \text{(Equation 1)}$$

$$y_2[n] = \frac{1}{mi} \sum_{i=n-ma+d/2+1}^{n-d/2} x[i] \quad \text{(Equation 2)}$$

where "$y_1[n]$" denotes a filter having a relatively large filter size, "$y_2[n]$" denotes a filter having a relatively small filter size, "ma" and "mi" denote the larger of two integer values "na" and "nd", "d" denotes the absolute value of (na−nd), "na" denotes the integer value of ($T_{ra}/T_s$), "nd" denotes the integer value of ($T_{rd}/T_s$), "$T_s$" denotes sampling time, "$T_{ra}$" denotes the size of the acceleration filter and is expressed by (Acc/Jerk), "$T_{rd}$" denotes the size of the deceleration filter and is expressed by (Dec/Jerk), "Jerk" denotes the magnitude of jerk, "Acc" denotes acceleration, and "Dec" denotes deceleration, wherein the acceleration filter is used to filter a pattern polynomial corresponding to an acceleration section of the position pattern, and the deceleration filter is used to filter a pattern polynomial corresponding to a deceleration section thereof, wherein if the acceleration and deceleration filters have different filter sizes, switching timing of one of the acceleration and deceleration filters, which has a relatively small filter size, is shifted in time with respect to switching timing of the other filter, which has a relatively large filter size, in order to prevent a switching error from occurring when the acceleration and deceleration filters are switched, and wherein the position profile controls a servomotor as a drive source to move each joint of an industrial articulated robot by determining work pattern and time.

15. The computer readable storage medium according to claim 14, wherein the operation of selecting of one of the plurality of position patterns comprises:

comparing an initial velocity of the position pattern with a reference velocity;

selecting one of a plurality of position pattern groups based on the comparison; and selecting one of a plurality of position patterns, which belong to the selected position pattern group, according to a given target position.

16. The computer readable storage medium according to claim 14, wherein the selective activation of one of the plurality of filters comprises:

activating an acceleration filter when receiving a pattern polynomial corresponding to an acceleration section of the position pattern;

activating a deceleration filter when receiving a pattern polynomial corresponding to a deceleration section of the position pattern; and maintaining the activation of a previously activated filter when receiving a pattern polynomial corresponding to a constant-velocity section of the position pattern.

17. A device to generate a position profile in a motion controller, comprising:

a pattern coefficient generator to receive a selection of one of a plurality of position patterns that are based on velocity change and to generate pattern and time coefficients of the received position pattern;

a contour generator to generate a pattern polynomial of a contour of each section of the position pattern with the generated pattern and time coefficients; and a controller to selectively activate one of a plurality of filters that generate a position profile, wherein the plurality of filters comprise an acceleration filter and a deceleration filter, wherein the filter having the relatively large filter size is designed as expressed by the following equation 1 and the filter having the relatively small filter size is designed as expressed by the following equation 2:

$$y_1[n] = \frac{1}{ma} \sum_{i=n-ma+1}^{n} x[i] \quad \text{(Equation 1)}$$

$$y_2[n] = \frac{1}{mi} \sum_{i=n-ma+d/2+1}^{n-d/2} x[i] \quad \text{(Equation 2)}$$

where "$y_1[n]$" denotes a filter having a relatively large filter size, "$y_2[n]$" denotes a filter having a relatively small filter size, "ma" and "mi" denote the larger of two integer values "na" and "nd", "d" denotes the absolute value of (na−nd), "na" denotes the integer value of ($T_{ra}/T_s$), "nd" denotes the integer value of ($T_{rd}/T_s$), "$T_s$" denotes sampling time, "$T_{ra}$" denotes the size of the acceleration filter and is expressed by (Acc/Jerk), "$T_{rd}$" denotes the size of the deceleration filter and is expressed by (Dec/Jerk), "Jerk" denotes the magnitude of jerk, "Acc" denotes acceleration, and "Dec" denotes deceleration, wherein the acceleration filter is used to filter a pattern polynomial corresponding to an acceleration section of the position pattern, and the deceleration filter is used to filter a pattern polynomial corresponding to a deceleration section thereof, wherein if the acceleration and deceleration filters have different filter sizes, switching timing of one of the acceleration and deceleration filters, which has a relatively small filter size, is shifted in time with respect to switching timing of the other filter, which has a relatively large filter size, in order to prevent a switching error from occurring when the acceleration and deceleration filters are switched, and wherein the position profile controls a servomotor as a drive source to move each joint of an industrial articulated robot by determining work pattern and time.

\* \* \* \* \*